Figure 1:
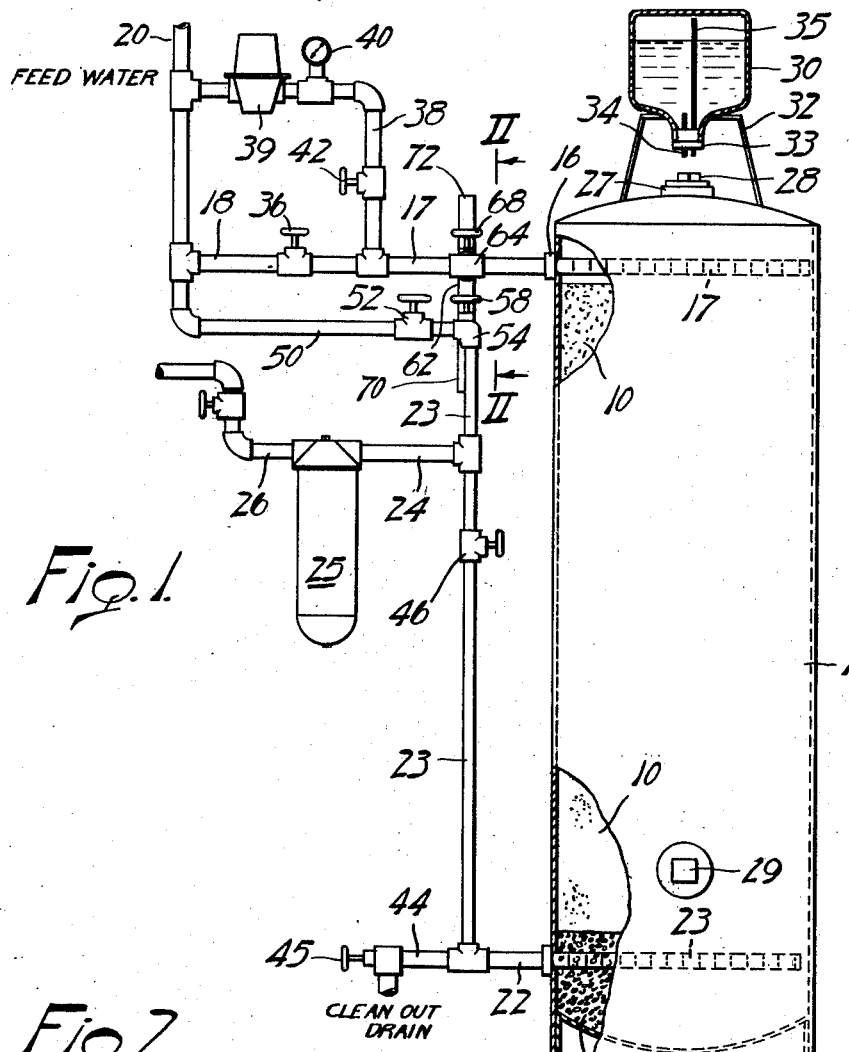

April 21, 1953 T. H. GRISWOLD 2,635,755
PROCESS AND APPARATUS FOR CONDITIONING WATER
Filed June 23, 1949

INVENTOR
Truman H. Griswold
BY
Bean, Brooks, Buckley & Bean
ATTORNEYS

Patented Apr. 21, 1953

2,635,755

UNITED STATES PATENT OFFICE 2,635,755

PROCESS AND APPARATUS FOR CONDITIONING WATER

Truman H. Griswold, Hamburg, N. Y.

Application June 23, 1949, Serial No. 100,792

8 Claims. (Cl. 210—42.5)

This invention relates to an improved process and means for conditioning water supplies such as contain various compounds of sulphur, as in the case of some ground waters from wells or springs to be used in domestic or small institutional or business establishments as distinguished from larger industrial users having substantially unlimited water supplies available. More particularly, the invention relates to an improved activated carbon filter apparatus and to an improved method and means for reactivating the carbon charge thereof for use in rendering relatively limited supplies of such water palatable and non-odorous.

It is of course known that activated carbon or charcoal will absorb and/or adsorb various sulphur compounds as are often found for example in ground waters; but the practical employment thereof for the purpose of conditioning relatively limited supplies of such waters so as to be palatable and non-odorous for domestic and small business uses for example has been largely precluded because of the excessive costs involved. Therefore, it is an object of the present invention to provide an improved method and means for reactivating a filter bed comprising activated carbon or charcoal, as in connection with a relatively small capacity filter installation.

Another object of the invention is to provide an improved means for reconditioning activated carbon or charcoal as in a domestic filter installation; said means comprising a particularly compact and self-contained apparatus.

Another object of the invention is to provide means as aforesaid which is of utmost mechanical simplicity and which operates with improved efficiency without requiring the application of heat to effect the reconditioning reaction.

Other objects and advantages of the invention will appear from the specification hereinafter.

The invention contemplates employment of an improved method and means and oxidizing agent in a process for reconditioning a filter bed comprising activated carbon or charcoal which has become substantially saturated with sulphur compounds abstracted from ground waters or the like previously filtered through the bed; the oxidizing agent being hydrogen peroxide also known as peroxide of hydrogen, or hydrogen dioxide. This agent may be supplied to the apparatus in the form of a stream of hydrogen peroxide solution, or a solid peroxide such as sodium carbonate peroxide; potassium carbonate peroxide; sodium pyrophosphate peroxide; potassium pyrophosphate peroxide; or the like, which dissolve in the water contained in the tank. It has been determined that when such compounds are employed a similar oxidation of sulphur compounds such as may have been adsorbed in the carbon filter bed is effected. If desired, for reasons of greater efficiency, hydrogen peroxide may be formed in the unit by concurrent feed of a solution of solid peroxide and a suitable acid. Incidentally, the sodium and/or potassium salt by-products of the hereinabove reactions are readily washed out through the filter unit.

It appears that this method of treating the contaminated filter bed results in reconditioning thereof by reason of the fact that the contained sulphur compounds include hydrogen sulphide (predominately) and/or other organic sulphur containing compounds, which reacts with hydrogen peroxide to principally form water and precipitated sulphur particles which flush away with the stream flowing through the filter bed. Whereas, activated carbon of powdered form has been previously used as a decolorizing medium in connection with various heat employing processes and the like, the present invention contemplates the use of activated carbon of granular form such as may be produced from charcoal of 4–10 mesh for example; and in accord with my invention I economically reactivate the filter bed through use only of dilute water solutions at atmospheric or normal water temperatures.

Figure 2:
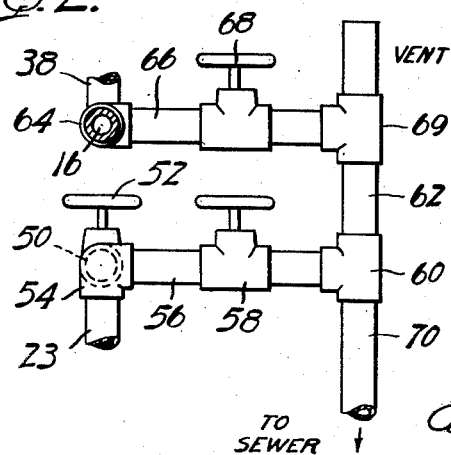

By way of example, a typical apparatus for employment of the method of the present invention, such as may be conveniently used for treating service well or spring water of limited supply as in a residence or small institution or business establishment, is illustrated in the accompanying drawing, wherein:

Fig. 1 is a side elevation, with portions broken away, of a water desulphurizing and reactivating unit of the invention; and Fig. 2 is a fragmentary section, on an enlarged scale, taken along line II—II of Fig. 1.

As shown in the drawing, the service water desulphurizing bed is illustrated as comprising a mass of granular size activated carbon 10 which is vertically supported upon a bed of gravel 12 within a cylindrical tank 14. The tank 14 is connected in series with the water circulating system as by means of an inlet connection 16 which leads through pipes 17—18 to the feed water line 20. Adjacent the bottom end of the tank 14 a desulphurized water outlet connection 22 is coupled to a pipe 23 which leads to a pipe 24 having connected therein a final clarifying filter 25. The outlet from the filter 25 is indicated at 26 and may be arranged in any suitable manner to connect into the water service system so as to deliver desulphurized water thereto.

The carbon bed and inlet and outlet connections 16—22 are so relatively arranged that the inlet 16 delivers water to be treated into the upper end of the tank 14 through a header 17 disposed just above the top level of the carbon bed, while the outlet connection 22 draws water through a header 23 disposed in the gravel bed 12 just below the bottom level of the carbon bed. Thus, it will be understood that in normal operation of the apparatus the ground water from a well or spring or the like will enter the system through the pipe 20 and will thus be conducted through the inlet connection 16 and through the carbon bed 10 and thence out through the outlet connection 22 and through the filter 25 into the treated water delivery pipe 26.

An opening is provided in the top end portion of the tank 14 as for example in the manner of an internally threaded collar 27 into which is normally fitted a screw plug 28 so as to seal the tank to provide a closed water circulating system in combination with the piping referred to. A clean-out opening which is also normally closed by means of a screw plug may also be preferably provided as indicated at 29 near the lower level of the carbon bed, so as to facilitate occasional replacement of the carbon bed material, as may be required.

To provide for reconditioning the carbon bed 10 subsequent to substantial saturation thereof with sulphur compounds, I arrange to slowly feed a solution of hydrogen peroxide through the tank top opening 27 while permitting a reduced flow of water to enter the tank through the connection 16 and while opening the outlet connection 22 to a disposal sewer. For this purpose, as shown in Fig. 1, a vessel such as a glass bottle 30 containing a 5 to 10% solution of hydrogen peroxide may be mounted in inverted position above the opening 27 (with the cap 28 removed) as by means of a support or stand 32. The bottle 30 is fitted with a rubber stopper 33 through which extend a short solution feed tube 34 and an air tube 35; either one of the tubes being of such small orifice dimension as to permit the hydrogen peroxide solution to only slowly drip or flow from the bottle 30 into the tank 14. Of course it will be understood that the rate of flow from the bottle into the tank may be regulated as by provision of some suitable valve means on either one of the tube members, if preferred.

To provide for simultaneous feeding of service water from the feed water line into the upper end of the tank so as to mingle with the hydrogen peroxide solution as it flows through the carbon bed, a valve 36 is provided in the pipe 18 so that normal flow of feed water therethrough may be cut off and in lieu thereof feed water may be supplied through a by-pass conduit system 38 which includes a pressure regulating valve 39, a pressure indicating gauge 40, and a normally closed valve 42. Thus, upon closing of the valve 36 and opening of the valve 42 a reduced supply of feed water will flow into the upper end of the tank 14; the rate of flow being previously determined and adjusted by presetting of the regulating valve 39. To assist in cleaning out the carbon bed from the tank 14 for replacement of the carbon material as may be required from time to time a sewer connection 44 is provided with a normally closed valve 45 in connection with the pipe 22, and a normally opened valve 46 is furnished in the normal treated water outlet conduit 23. Thus, upon closing of the valve 46 and opening of the valve 45, the contents of the tank 14 may be directly conducted to any convenient disposal point such as a sewer or the like.

Preliminary to chemical treatment of the filter bed for reactivation and cleaning thereof it is highly desirable to first mechanically backwash the carbon bed so as to physically disrupt and flush away as much as possible of the solids accumulations within the tank 14 such as are foreign to the carbon bed itself. For such purpose as shown in Figs. 1 and 2, I provide a branch feed water conduit 50 with a normally closed valve 52 therein, leading into connection with a three-way elbow 54 which also connects with the upper end of the desulphurized water line 23. At its third opening the elbow 54 connects to a pipe 56 which includes a normally closed valve 58 and thence leads into connection with a T 60 which forms a portion of a vertical conduit 62. The pipe 16 also includes a T 64 which connects with a pipe 66 containing a normally closed valve 68 which also leads into a T connection at 69 with the vertical conduit 62. The upper end of the conduit 62 is cut off and left open at an elevation just above the top end of the tank 14 so as to comprise a vent device, while the lower end of the conduit 62 leads downwardly as indicated at 70 (Fig. 2) for connection with any suitable sewer outlet, as will be explained hereinafter.

Thus, it will be appreciated that preliminary to a chemical treatment of the carbon bed 10 the bed may be backwashed by closing the valves 36—42 and opening the valves 52 and 68. Thus, feed water will flow downwardly through the conduit system and through the bottom connection 22 into the lower end of the tank and thence upwardly through the bed and out of the connection 16 and thence through the valve 68 into the conduit 62 and thence downwardly to the sewer outlet. Then, after the carbon bed has thus been mechanically washed, the valve 52 will be closed; the valve 42 will be opened; the valve 46 will remain open; the valve 68 will be closed; and the valve 58 will be opened; and the hydrogen peroxide solution will be permitted to start to drip into the upper end of the tank 14. The mixture of feed water and hydrogen peroxide solution will then flow slowly through the filter bed so as to oxidize the sulphur compounds absorbed and/or adsorbed therein, and when the hydrogen peroxide solution is exhausted the jar 30 may be removed and the closure plug 28 replaced. Feed water will then be permitted to continue to flow through the carbon bed so as to rinse the latter of hydrogen peroxide, until such time as the bed is thereby reactivated and cleaned and is substantially rinsed of the treating solution. Then valve 42 may be closed and the valve 36 opened, and the valve 46 opened and the valve 58 closed; whereupon the system is in condition to circulate feed water therethrough in normal manner so as to supply desulphurized water through the water supply conduit 26.

Particular attention is called to the fact that the conduit 56 (Fig. 2) is preferably disposed at a slightly lower elevation than the upper level of the carbon bed 10, and the relative elevations thereof and the inflow water rate are preferably arranged so as to operate to maintain a complete immersion of the carbon bed during the treatment of the bed. This insures that all parts of the bed are treated with maximum uniformity.

As indicated at 72, the sewer conduit 70 is vented so as to preclude the possibility that a syphoning effect may be established to lower the liquid level in the tank during treatment of the carbon bed.

It will of course be understood that the hydrogen peroxide reagent may be supplied in any convenient form and in any preferred strength, but by way of an example of a practical application of the invention a five to ten percent hydrogen peroxide solution may be employed and the flow thereof from the bottle 30 regulated in relation to the flow of feed water so that the hydrogen peroxide solution feeds into the tank 14 in approximately the ratio of 1 part to 50 parts of feed water. Naturally, the amount of hydrogen peroxide reagent required for treatment of the carbon bed will vary according to the size of the unit and other factors, but I have found from experience that a household size unit having a filter tank for example say 4-6 cubic feet capacity may be adequately serviced by a quantity of hydrogen peroxide such as may be accommodated within a one gallon bottle as indicated at 30. Also, it will be appreciated that the time required for reactivating the carbon bed may vary substantially, but I have determined that such reactivation may be ordinarily accomplished in a household size unit as described hereinabove in approximately one hour. Therefore, it will be further appreciated that the method and apparatus of the present invention is particularly suited to domestic and small business installations such as may be expeditiously serviced from time to time by the householder or other personnel not necessarily highly trained for the job.

Also, as mentioned hereinabove, the hydrogen peroxide for oxidizing the sulphur compounds absorbed and/or adsorbed within the carbon bed may be formed in place in lieu of being supplied to the tank 14 in the form of a hydrogen peroxide solution. In such case, the peroxide compound either in solid or solution form may be simply dumped into the top of the tank through the collar 27 and on top of the carbon bed (subsequent to backwashing of the carbon bed) either with or without acid addition as referred to hereinabove, and then feed water is introduced as through the pressure regulating valve to carry the oxidizing agent downwardly through the carbon bed. It has been determined that the somewhat acidic condition within the tank due probably to the presence of organic material therein, results in decomposition of the hydrogen peroxide forming compound so as to liberate hydrogen peroxide and oxidizing substance which attacks the sulphur compound adsorbed or absorbed within the carbon bed so as to oxidize the latter and cause the solid sulphur particles to be precipitated and amenable to flushing out of the carbon bed as explained hereinabove.

In any case it will be appreciated that the apparatus of the invention comprises a unique arrangement of parts such as is adapted to provide an installation which is relatively simple and feasible to install in connection with any relatively small domestic or business water supply system for desulphurizing ground waters such as require removal of sulphur compounds therefrom so as to render the water palatable and non-odorous. Also, it will be appreciated that the apparatus of the invention is adapted to be periodically reactivated and cleaned by relatively unskilled personnel such as the average home owner, without undue difficulty and inconvenience. For this reason the invention provides a unique solution to a very troublesome and quite common problem in connection with water supplies especially in rural communities such as do not provide centralized water treating and supply systems.

Although only a few variations of the invention have been discussed herein it will of course be appreciated that various changes may be made therein without departing from the scope of the invention and of the spirit of the accompanying claims.

I claim:

1. An apparatus for desulphurizing water containing sulphur compounds, said apparatus comprising a tank, a filter bed of activated carbon of granular size within the tank, conduit means conveying feed water requiring desulphurization into said tank at the upper elevation thereof so that said feed water filters downwardly through said carbon bed for removal thereby of the sulphur compounds from said water, desulphurized water outlet conduit means in open communication with said tank at the lower elevation thereof, means at the top of said tank adapted for periodically introducing by dripping into said tank a supply of hydrogen peroxide in aqueous solution, and water level maintaining means for said tank for immersing said bed in downwardly flowing water for reaction of said hydrogen peroxide in dilute form with the sulphur compounds taken up within said filter bed for reactivation of the latter.

2. An apparatus for desulphurizing water containing sulphur compounds, said apparatus comprising a tank, a filter bed of activated carbon of granular size within the tank, conduit means conveying feed water requiring desulphurization into said tank at the upper elevation thereof so that said feed feed water filters downwardly through said carbon bed for removal thereby of the sulphur compounds from said water, desulphurized water outlet conduit means in open communication with said tank at the lower elevation thereof, means at the top of the tank for periodically introducing into said tank a supply of hydrogen peroxide in aqueous solution, and water level maintaining means for the tank for immersing the bed in downwardly flowing water whereby the hydrogen peroxide is diluted by the downward flow of the feed water and carried downwardly through the filter bed for reaction of the dilute hydrogen peroxide with the sulphur compounds removed from the water by the filter bed for reactivation of the filter bed.

3. The process of desulphurizing water containing sulphur compounds comprising flowing the sulphur containing water through a bed of activated carbon in a tank of a closed system to remove the sulphur compounds from the water, passing the desulphurized water from the closed system, regenerating the bed containing the sulphur compounds by introducing into the closed system simultaneously a solution of hydrogen peroxide and a controlled amount of water to dilute and distribute the hydrogen peroxide throughout the bed to oxidize the sulphur compounds, and rinsing the bed with wash water to wash away the residual hydrogen peroxide solution and the oxidized compounds from the bed.

4. The process of reactivating and cleaning a spent water desulphurizing bed of activated carbon containing sulphur compounds adhered thereto, comprising back washing the bed to mechanically flush accumulated solids therefrom, simultaneously passing a solution of hydrogen peroxide and a controlled amount of water to dilute and distribute the hydrogen peroxide throughout the bed to oxidize the sulphur compounds therein and rinsing the bed with wash water to wash away the residual hydrogen peroxide solution and the oxidized compounds from the bed.

5. The process as defined in claim 4 in which the solution of hydrogen peroxide is of the strength of 5 percent to 10 percent and the water is controlled to a ratio of approximately 50 parts to 1 part of hydrogen peroxide.

6. An apparatus for desulphurizing water containing sulphur compounds, said apparatus comprising a tank, a filter bed of activated carbon within the tank, conduit means conveying feed water requiring desulphurization into said tank at the upper elevation thereof so that the feed water filters downwardly through the bed for removing the sulphur compounds from the water, desulphurized water outlet conduit means in communication with the tank at the lower elevation thereof, means operatively connected with the top of the tank of periodically introducing into the tank a supply of hydrogen peroxide in aqueous solution, and water level maintaining means between said feed water conduit and the top of the tank for maintaining the bed immersed in downwardly flowing water to carry the peroxide through the bed for reaction with the sulphur compounds taken up by the bed for reactivation of the bed.

7. An apparatus as claimed in claim 6 in which the water level maintaining means comprises a by-pass line between the feed water conduit and the upper elevation of the tank and a pressure regulator in the by-pass line to regulate the amount of water passing to the tank to maintain the bed immersed in the water.

8. The process as recited in claim 3 in which the solution of hydrogen peroxide is of the strength of 5% to 10% and the water is controlled to a ratio of approximately 50 parts to one part of hydrogen peroxide for reactivation of the bed.

TRUMAN H. GRISWOLD.

References Cited in the file of this patent

UNITED STATES PATENTS

| Number | Name | Date |
|---|---|---|
| 1,323,239 | Basore et al. | Dec. 2, 1919 |
| 1,570,890 | Hall | Jan. 26, 1926 |
| 1,747,175 | Mahler | Feb. 18, 1930 |
| 1,778,280 | Shetler | Oct. 14, 1930 |
| 1,782,850 | Hill | Nov. 25, 1930 |
| 1,895,062 | Zurcher | Jan. 24, 1933 |
| 1,929,405 | Bilde | Oct. 10, 1933 |
| 1,966,279 | Behrman | July 10, 1934 |
| 2,031,711 | Jaenicke et al. | Feb. 25, 1936 |

OTHER REFERENCES

Treatise on Chemistry, vol. 1, pages 392-394, 1920, Roscoe and Schorlemmer.

Treatise on Inorganic and Theoretical Chemistry by Mellor, vol. 1, 1922, page 941.